United States Patent [19]

Watanabe

[11] Patent Number: 4,742,547
[45] Date of Patent: May 3, 1988

[54] PATTERN MATCHING APPARATUS

[75] Inventor: Takao Watanabe, Tokyo, Japan

[73] Assignee: NEC Corporation, Tokyo, Japan

[21] Appl. No.: 80,249

[22] Filed: Jul. 28, 1987

Related U.S. Application Data

[63] Continuation of Ser. No. 910,868, Aug. 24, 1986, abandoned, which is a continuation of Ser. No. 529,826, Sep. 6, 1983, abandoned.

[30] Foreign Application Priority Data

Sep. 3, 1982 [JP] Japan .............................. 57-153767

[51] Int. Cl.$^4$ .............................................. G10L 5/00
[52] U.S. Cl. ...................................................... 381/51
[58] Field of Search ............................. 381/51, 41–50; 364/513, 513.5, 900 MS File; 382/30, 37, 34

[56] References Cited

U.S. PATENT DOCUMENTS 4,467,437  8/1984  Tsuruta et al. ................. 364/513.5

OTHER PUBLICATIONS

D. P. Algorithm Optimization for Spoken Word Recognition Sakoe et al., IEEE ASSP, Feb. 1978 pp. 43–49.
Digital Processing of Speech Signals, Rabiner et al. Prentice-Hall Inc., 1978 pp. 476–477.

Primary Examiner—Gareth D. Shaw
Assistant Examiner—John G. Mills, III
Attorney, Agent, or Firm—Sughrue, Mion, Zinn, Macpeak & Seas

[57] ABSTRACT

A pattern matching apparatus wherein an input pattern is compared against a reference pattern by a distance or similarity measure ($d_{ij}$) between data at respective time points (i, j) of the two patterns. An integration variable ($g_{ij}$) of the distance measure is developed along a time path between the time axes of the two patterns to provide a measure of pattern matching. According to the invention, the path may deviate from 45°, i.e. the input pattern becomes locally time-compressed or time-expanded, only toward the time axis of the longer pattern. Therefore, local time compression or expansion is allowed only if the total input pattern length requires time compression or expansion, respectively, to match the total length of the reference pattern.

7 Claims, 3 Drawing Sheets

PATTERN MATCHING APPARATUS

This is a continuation of application Ser. No. 910,868, now abandoned, filed Sept. 24, 1986, which is a continuation of application Ser. No. 529,826, now abandoned, filed Sept. 6, 1983.

BACKGROUND OF THE INVENTION

This invention relates to a pattern matching apparatus for comparing patterns, such as speech patterns, that are expressed as a sequence of feature vectors.

A pattern matching method as one of the pattern recognition methods has gained a wide application. In accordance with this pattern matching method, a pattern to be recognized is registered in advance as a reference pattern and an unknown pattern is compared with the reference pattern so as to determine the pattern having the highest similarity measure as a result of recognition.

In the pattern matching method, it is of the utmost importance to cope with variation such as the variation of a speech speed in the speech pattern. A time axis normalization matching method utilizing a dynamic programming method (which will be hereinafter referred to as to the "DP method") is extremely effective as the counter-measure and hence, has been used widely. The DP method is discussed in detail, for example, in "Dynamic Programming Algorithm Optimization for Spoken Word Recognition", Hiroaki SAKOE et al, IEEE Transactions an Acoustics, Speech, and Signal Processing, Vol. ASSP-26, No. 1, February, 1978, pages 43 to 49, U.S. Pat. Nos. 3,816,722 and 4,049,913.

Assume that the sequences of feature vectors of two patterns A and B are given by the following formulas, respectively:

$$A = \{a(1), a(2), \ldots, a(i), \ldots, a(I)\}$$

$$B = \{b(1), b(2), \ldots, b(j) \ldots, a(J)\}$$

Then, the distance between the patterns A and B can be determined in the following manner in accordance with the conventional DP method.

As to an integration quantity g relating to the distance $d(i, j)$ between the vectors $a(i)$ and $b(j)$, the following recurrence formula (1) is sequentially calculated from $i=1, j=1$ till $i=I, j=J$ with an initial condition being $g(1, 1) = d(1, 1)$:

$$g(i, j) = \min \begin{Bmatrix} d(i, j) + g(i - 1, j) \\ d(i, j) + g(i, j - 1) \\ 2d(i, j) + g(i - 1, j - 1) \end{Bmatrix} \quad (1)$$

The distance D between the patterns A and B is determined from $g(I, J)$ that is finally obtained, in accordance with the following equation (2):

$$D = \frac{1}{I + J - 1} g(I, J) \quad (2)$$

Equation (1) corresponds to the integration of $d(i, j)$ from a point (1, 1) to a point (I, J) on a lattice of $I \times J$ time points under the slope constraint (slope constraint of matching path) or local constraint given by the limitation inside the braces { } in equation (1) and weighting (which is not a always necessary). The slope constraint in this case may be free within the range of 90 degrees including both horizontal and vertical directions. Accordingly, the matching path is expanded and compressed on the time axis. Since the DP method determines the distance between the two patterns by expanding and compressing non-linearly the matching path on the time axis as described above, it can normalize the variation of the speed speed in matching the two patterns of the same category.

When the two patterns to be matched belong to different categories, however, the DP method involves the problem that the similar portions of the two patterns are emphasized by non-linear expansion and compression, therefore, matching is liable to be unnatural. This unnaturalness is not a critical problem in ordinary word recognition but becomes serious where the duration time of a consonant or the transient time from a consonant to a vowel is important, such as in monosyllable recognition. This will be discussed again elsewhere with an definite example. For example, this becomes a problem when the word "keep" to be recognized is matched with the reference word "peak". In the utterance /ki:p/ and /pi:k/ of the words "keep" and "peak", the consonants /k/ and /p/ have high similarity in speech recognition processing but the duration length /k/ is longer than that of /p/.

Consider the case where the duration time of the vowel portion of the input pattern is expanded and the input pattern length is longer than the reference pattern length. DP matching matches first /k/ of the input pattern with /p/ of the reference pattern, then their vowel portions /i:/ and finally /p/ of the input pattern with /k/ of the reference pattern. In this case, even if the duration length of the consonant /k/ differs from that of /p/, the patterns are expanded or compressed by the time normalization characteristics of DP matching as described above, so that they are matched. The distance (similarity) obtained at the final time point is not much different from the distance obtained when the reference word is pronounced as "keep" and hence, recognition error occurs. In other words, the difference of the duration time length between the consonants /k/ and /p/ is neglected, although it can be used as an important feature for distinguishing them.

SUMMARY OF THE INVENTION

The present invention is therefore directed to provide a pattern matching apparatus which can prevent unnatural matching in carrying out DP matching between two patterns.

It is another object of the present invention to provide a pattern matching apparatus which can reduce recognition error due to unnatural matching between different words in carrying out pattern matching in speech recognition.

It is still another object of the present invention to provide a pattern matching apparatus which can recognize the difference between similar consonant portions in carrying out pattern matching in speech recognition and can thus reduce recognition error.

In accordance with the present invention, there is provided a pattern matching apparatus which comprises first means for developing a first quantity $d(i, j)$, along time axes, representing the distance between feature vectors at each time point $(i, j)$ of first and second patterns, each expressed by a time sequence of feature vectors, second means for developing a second quantity g(i, j), which is an integration quantity of the first quantity at the time point (i, j), on the basis of at least the first quantity at time points including the time point described above and second quantities at times previous to the time point at a plurality of predetermined time points before the time point (i, j), and third means for comparing the length I of the first pattern with the length J of the second pattern and producing a signal designating a plurality of predetermined time points in the second means in accordance with the result of comparison.

The other objects and features of the present invention will become more apparent from the following description when taken in conjunction with the accompanying drawings.

DESCRIPTION OF THE PREFERRED EMBODIMENT

The variation of the speech speed of a speech pattern is primarily based upon the variation of the speech duration at the vowel portion. Therefore, it is not appropriate to expand or compress the pattern as a whole in the same ratio.

Figure 1A:
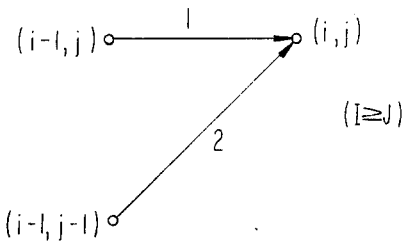
FIGS. 1A through 1C show local constraints of matching paths and are useful for explaining the principle of the present invention.
Figure 1B:
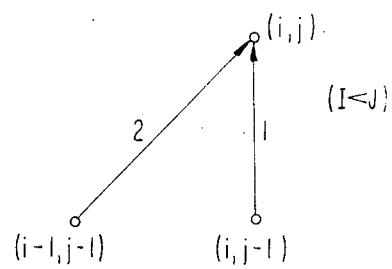
Figure 1C:
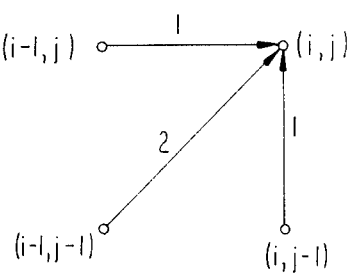

However, it is generally considered rare in different speeches of the same category (word) that a certain portion of the pattern is compressed whereas another is expanded. In matching two patterns A and B, therefore, the pattern B is non-linearly expanded (without compression) so as to match it with the pattern A if the pattern A is longer than B, and the pattern A is non-linearly expanded (without compression) so as to match it with B if the pattern B is longer than A. In the calculation of the recurrence formula in DP matching, this corresponds to the application of the slope constraints such as shown in FIGS. 1A and 1B. It indicates the use of $$g(i, j) = \min \left\{ \begin{array}{l} d(i, j) + g(i - 1, j) \\ 2d(i, j) + g(i - 1, j - 1) \end{array} \right\} \quad (3)$$

when the pattern A is longer than the pattern B (I≧J), and the use of $$g(i, j) = \min \left\{ \begin{array}{l} d(i, j) + g(i, j - 1) \\ 2d(i, j) + g(i - 1, j - 1) \end{array} \right\} \quad (4)$$

when the pattern B is longer than the pattern A (I<J). Incidentally, the conventional recurrence formula of equation (1) means the use of the constraint shown in FIG. 1C.

In this case compression and expansion are not effected simultaneously, therefore unnatural correspondence can not be easily established between the two patterns. The time difference between the patterns of the different categories can be preserved and the recognition accuracy can be improved by this technique.

FIGS. 2A and 2B and FIGS. 3A and 3B show examples of DP matching suitable for the understanding of the principle of the present invention. In each drawing, the ordinate represents the time axis of the input pattern and the abscissa does the time axis of the reference pattern. Symbols S and E represent the start and end of the DP matching path, respectively. The example shows the case where the input word (pattern) "keep" is subjected to pattern matching with the reference word (pattern) "peak".

Figure 2A:
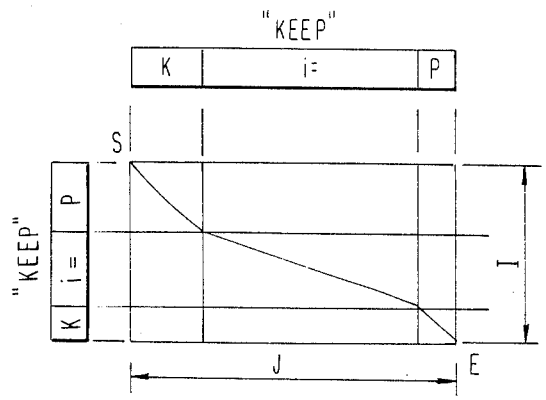
FIGS. 2A and 2B show an example to which the present invention is applied and a definite effect obtained thereby.

FIG. 2A shows the case where the input pattern "keep" is matched with the reference pattern "keep" but the vowel portion /i:/ of the utterance /k:p/ of the input pattern "keep" is shorter than that of the reference pattern. The duration time of /k/ is longer than that of /p/. As is obvious from the diagram, the time normalization characteristics of DP matching are fully exhibited (optimization expansion of the pattern) and the input pattern is made to correspond to the reference pattern most optimally.

Figure 2B:
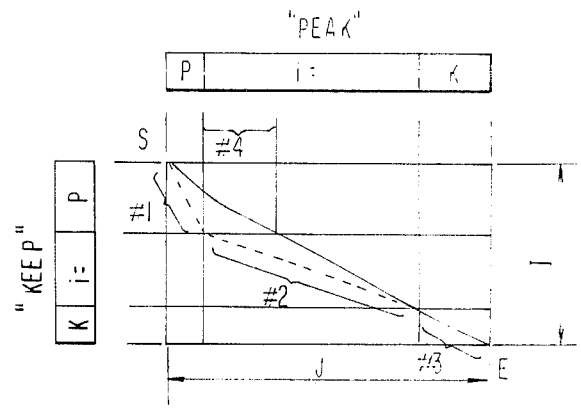

On the other hand, FIG. 2B shows the case where "peak" whose vowel portion /i:/ is relatively longer than that of the input pattern is used as the reference pattern. In this diagram, broken line represents the matching path in accordance with the conventional DP matching method. As described already, /p/ and /k/ have high similarity because they are phonetically similar phonemes. Accordingly, the similarity obtained finally becomes a large value due to the time normalization of ordinary DP matching, so that the possibility of recognition error becomes high. As can be seen clearly from the diagram, /k/ of the input pattern is longer than /p/ of the reference pattern at the matching path portion #1 and the input pattern is therefore compressed. On the other hand, the input pattern is expanded at both matching paths #2 and #3.

The present invention makes use of the recurrence formula (3) which requires a selection of the lattice points of known lattice point data (lattice time point data inside the braces {} in equations (3)) under the condition of I<J in order to prevent the matching path from advancing at an angle of at least 45°. For this reason, the matching path becomes such as one represented by solid line in FIG. 2B. In other words, the head portion #4 of the /i:/ portion of the reference pattern is matched with the tail portion of /k/ of the input pattern and hence, the distance at these portions becomes large (or similarity becomes small). As a result, the cumulative distance at the end E becomes large so that the possibility of recognition error becomes low.

Figure 3A:
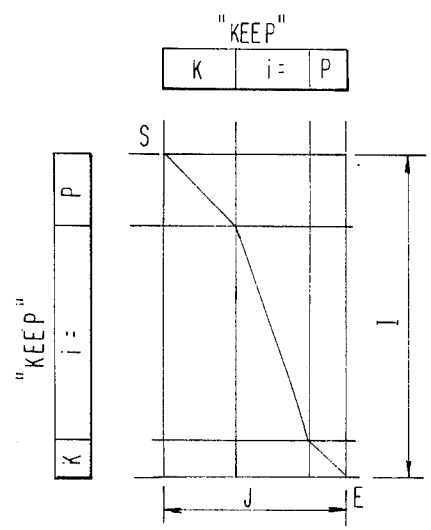
FIGS. 3A and 3B show another example to which the present invention is applied and a definite effect obtained thereby.
Figure 3B:
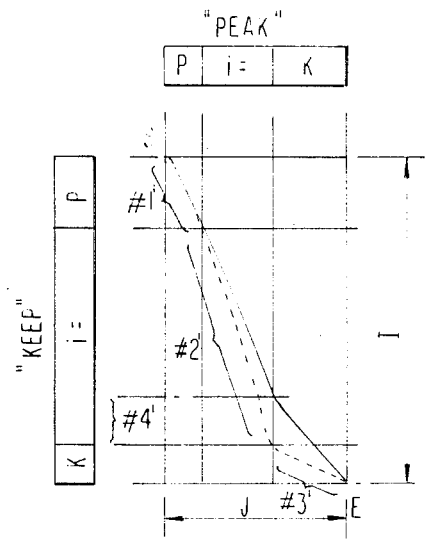

FIGS. 3A and 3B show the example of DP matching in the case where the input pattern length I is longer than the reference pattern length J. In FIG. 3A, both of the input and reference words are "keep" but the vowel portion /i:/ of the input pattern is longer than that of the reference pattern. Due to the characteristics of DP matching in the same way as in FIG. 2A, the pattern is expanded or compressed and an optimal matching path is followed.

FIG. 3B shows the case where the reference word to be matched is "peak". In accordance with conventional DP matching, the input pattern is compressed at the path portions #1' nd #2' represented by broken line (or a matching path having a steep inclination). In the case of the consonants /p/ and /k/ at the tails of the input and reference patterns, on the other hand, the latter is longer than the former so that the input pattern is expanded at the portion #3', on the contrary. Accordingly, the similarity between both patterns becomes high in the same way as in FIG. 2B and the possibility is high that "keep" is erroneously recognized as "peak".

In accordance with the present invention, however, the recurrence formula (4) which sets the slope angle of the matching path to at least 45° is used since I>J, and the matching path represented by solid line is taken. In other words, the matching path is analogous to the ordinary matching path from the start S to the intermediate portion of the vowel portion /i:/ (to the intermediate portion of the path #2') but deviates from the ordinary matching path. This is because the matching path must be arrived at its end E and the slope constraint of at least 45° is given. As a result, matching is established between the tail portion #4' of the vowel /i:/ of the input pattern and the head portion of /k/ of the reference pattern, so that the distance between them becomes large in the same way as in FIG. 2B and the possibility of recognition error is reduced remarkably.

The foregoing examples deal with the cases where the input pattern length is remarkably different from the reference pattern length. If there is no much difference between both pattern lengths, either one of the recurrence formulas (3) and (4) may be employed. This makes it possible to distinguish those different phonemes which are phonetically analogus to each other but have different duration lengths from each other (e.g., /k/ and /p/ in the foregoing embodiments) in carrying out pattern matching.

The following equation may also be used in place of the recurrence formulas (3) and (4) used in the foregoing description, and other arbitrary recurrence formulas which can provide suitable path slope constraints may also be used:

When $I \geq J$:

$$g(i,j) = \min \left\{ \begin{array}{l} 2d(i-1,j) + d(i,j) + g(i-2,j-1) \\ 2d(i,j) + g(i-1,j-1) \end{array} \right\} \quad (5)$$

When $I < J$:

$$g(i,j) = \min \left\{ \begin{array}{l} 2d(i,j-1) + d(i,j) + g(i-1,j-2) \\ 2d(i,j) + g(i-1,j-1) \end{array} \right\} \quad (6)$$

Figure 4A:
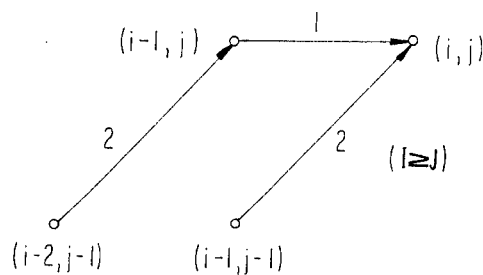
FIGS. 4A and 4B show local constraints of the matching path in the present invention.
Figure 4B:
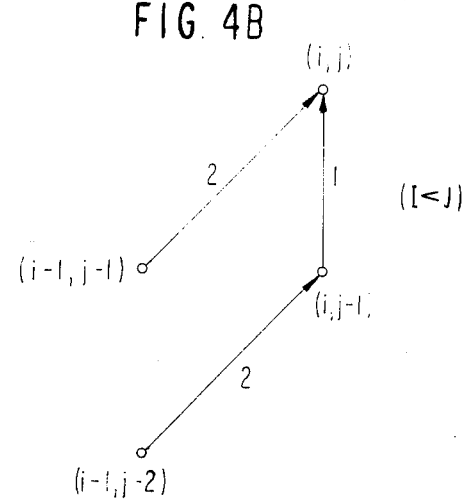

The formulas (5) and (6) correspond to the slope constraint and weighting shown in FIGS. 4A and 4B. Similar recurrence formulas can also be used so long as they take different forms when $I \geq J$ and when $I < J$. Recurrence formulas without weighting may also be used. The principle of the present invention holds not only to the speech patterns that have been described but also to arbitrary patterns which can be expressed as a sequence of feature vectors such as characters.

Next, the definite construction of the present invention will be described with reference to FIG. 5.

The input pattern A and the reference pattern B, each consisting of a sequence of feature vectors described already, are stored in first and second vector memories 11 and 12, respectively. A controller 10 applies signals $i_l$ and $j_l$ representative of time points $i_l$ and $j_l$ of the input and reference patterns (vectors) to the memories 11 and 12, and corresponding vectors $a_{il}$ and $b_{jl}$ are read out from the memories. A distance calculator 13 calculates the distance $d(i_l, j_l)$ between $a_{il}$ and $b_{jl}$. Various measures of distance can be used as this distance, such as a distance expressed by the absolute value of the difference between both vectors, an Euclidean distance, an inner product. The distance data $d(i_l, j_l)$ thus obtained are stored at an address of $(i_l, j_l)$ in a distance memory 15. This distance calculation may be made for all the points of the time lattice points formed by the two patterns A and B, but it is more effective to carry out the calculation also for the domain of the adjustment window which is determined by the local constraints within the braces { } of the formulas (1), (3) and (4).

A recurrence calculator 15 calculates an integration quantity expressed by the formula (3) or (4), for example. It calculates the integration quantity $g(i_2, j_2)$ at the time point of the address signal $i_2, j_2$ supplied from the controller 10 based on the following equation in accordance with the formula (3) or (4):

$$g(i_2,j_2) = \min \left\{ \begin{array}{l} d(i_2,j_2) + g(i_2-1,j_2) \\ 2d(i_2,j_2) + g(i_2-1,j_2-1) \end{array} \right\} \quad (3')$$

or $$g(i_2,j_2) = \min \left\{ \begin{array}{l} d(i_2,J_2) + g(i_2,j_2-1) \\ 2d(i_2,j_2) + g(i_2-1,j_2-1) \end{array} \right\} \quad (4')$$

The integration quantity thus obtained is sorted in an integration memory 17. Specifically, $d(i_2, j_2)$ is read out from the distance memory 14 by the address signal $i_2, j_2$ from the controller 10, while a pair of integration quantities $g(i_2-1, j_2)$ and $g(i_2-1, j_2-1)$ or $g(i_2, j_2-1)$ and $g(i_2-1, j_2-1)$ are read out from the integration memory 17 in accordance with the address signal $i_3, j_3$ (which has a value determined by the form of the recurrence formula and is $(i_3, j_3) = (i_2-1, j_2)$ in the case of the formula (3') and $(i_3, j_3) = (i_2-1, j_2-1)$ in the case of the formula (4')). These quantities are then applied to the recurrence calculator 15. The calculator 15 calculates the recurrence formula (3') or (4') which is specified by a signal $S_1$ or $S_2$ from a comparator 16. The comparator 16 compares the lengths I and J of both patterns stored in the first and second vector memories 11 and 12 and delivers the signals $S_1$ and $S_2$ to the recurrence calculator 15 so that it calculates the recurrence formula (3') when $I \geq J$ and the recurrence formula (4') when $I < J$. In other words, the signals $S_1$ and $S_2$ designate the local constraints when determining the integration quantity $g(i, j)$.

In this manner, the integration quantity $g(I, J)$ at the time point I, J is finally obtained and produced. This output is a quantity representative of the similarity between the input pattern A and the reference pattern B or the distance between them and can be determined as a normalized distance as expressed by the formula (2), for example:

$$D = \frac{1}{I + J - 1} g(I, J)$$

Figure 5:
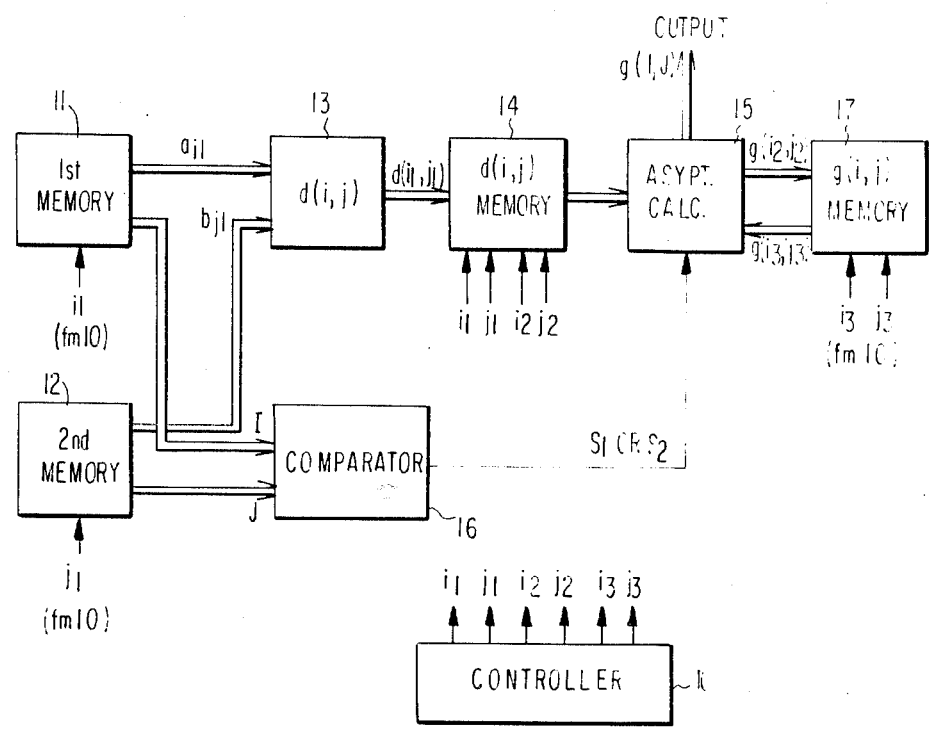
FIG. 5 is a block diagram and shows an embodiment of the present invention.

The construction and its operation shown in FIG. 5 are known in speech recognition apparatus, for example, and are disclosed in the aforementioned U.S. patents.

What is claimed is:

1. A pattern matching apparatus for speech pattern recognition comprising:

first means for developing a first quantity representing a distance or similarity measure between feature vectors at respective time points (i, j) of first and second patterns, each of said first and second patterns expressed by a time sequence of feature vectors, along time axes;

second means for developing a second quantity which is an integration quantity of said first quantity at integration time point (i, j) on the basis of said first quantity at time points including at least said integration time point and a plurality of second quantities obtained at a plurality of predetermined time points previous to said integration time point (i, j); and comparison means for comparing lengths I, J of said first and second patterns with each other and producing a signal for selecting said plurality of predetermined time points in said second means in accordance with the result of the comparison.

2. The pattern matching apparatus as defined in claim 1 wherein said second means develops said second quantity g(i, j) in accordance with the following formulas:

when $I \geq J$:

$$g(i, j) = \min \left\{ \begin{array}{l} d(i, j) + g(i - 1, j) \\ 2d(i, j) + g(i - 1, j - 1) \end{array} \right\}$$

when $I < J$:

$$g(i, j) = \min \left\{ \begin{array}{l} d(i, j) + g(i, j - 1) \\ 2d(i, j) + g(i - 1, j - 1) \end{array} \right\}$$

3. The pattern matching apparatus as defined in claim 1 wherein said second means develops said second quantity g(i, j) in accordance with the following formulas:

when $I \geq J$:

$$g(i, j) = \min \left\{ \begin{array}{l} 2d(i - 1, j) + d(i, j) + g(i - 2, j - 1) \\ 2d(i, j) + g(i - 1, j - 1) \end{array} \right\}$$

when $I < J$:

$$g(i, j) = \min \left\{ \begin{array}{l} 2d(i, j - 1) + d(i, j) + g(i - 1, j - 2) \\ 2d(i, j) + g(i - 1, j - 1) \end{array} \right\}$$

4. The pattern matching apparatus as defined in claim 1 further including means for weighting said first quantity as the basis for obtaining said second quantity.

5. The pattern matching apparatus as defined in claim 1 wherein said predetermined time points are determined in accordance with the comparison result of I and J so that the slope constraint of the advance of matching path when developing said second quantity is limited at 45° as the boundary.

6. The pattern matching apparatus as defined in claim 1 wherein said first and second patterns are input and reference patterns of speech, respectively.

7. A pattern matching apparatus for speech pattern recognition comprising:

first and second memories for storing first and second patterns, each expressed as a time sequence of feature vectors, respectively;

first means for calculating a first quantity of a distance or similarity measure between said first and second patterns at each time point (i,j);

a third memory for storing said first quantity thus obtained;

comparison means for generating a signal $S_1$ or $S_2$ when the length of said first pattern is longer or shorter, respectively, than that of said second pattern;

second means for developing a second quantity which is an integration quantity of said first quantity at a time point (i,j) on the basis of said first quantity at said time point and the second quantity obtained at a plurality of time points predetermined in response to said signals $S_1$ and $S_2$ at time points previous to said time point (i,j); and fourth memory for storing said second quantity obtained from said second means.

* * * * *

UNITED STATES PATENT AND TRADEMARK OFFICE
CERTIFICATE OF CORRECTION

PATENT NO. : 4,742,547

DATED : May 3, 1988

INVENTOR(S) : Watanabe

It is certified that error appears in the above-identified patent and that said Letters Patent is hereby corrected as shown below:

COLUMN 2, LINE 9     After "of the" delete the first "speed" and insert --speech--;

COLUMN 5, LINE 4     Delete "nd" and insert --and--;

COLUMN 5, LINE 31    Delete "much" and insert --such large--;

COLUMN 5, LINE 35    Delete "analogus" and insert --analogous--

COLUMN 6, EQUATION (3')   Delete "$d(i_2,j_2)+g(i_2,j_2 - 1$" insert --$d(i_2,j_2)+g(i_2,j_2 - 1)$--;

COLUMN 6, EQUATION (4')   Delete "J" and insert --j--.

Signed and Sealed this

Fourth Day of October, 1988

Attest:

DONALD J. QUIGG

*Attesting Officer*     *Commissioner of Patents and Trademarks*